(12) United States Patent
Kanellos et al.

(10) Patent No.: US 12,426,740 B2
(45) Date of Patent: Sep. 30, 2025

(54) PORTABLE, BEVERAGE MIXING SYSTEM

(71) Applicant: Mauve Leopard Inc., Palm Beach, FL (US)

(72) Inventors: Mariana Kanellos, Palm Beach, FL (US); Harrison Alva, Palm Beach, FL (US)

(73) Assignee: Mauve Leopard Inc., Palm Beach, FL (US)

( * ) Notice: Subject to any disclaimer, the term of this patent is extended or adjusted under 35 U.S.C. 154(b) by 489 days.

(21) Appl. No.: 17/941,989

(22) Filed: Sep. 9, 2022

(65) Prior Publication Data

US 2023/0074503 A1    Mar. 9, 2023

Related U.S. Application Data

(60) Provisional application No. 63/346,659, filed on May 27, 2022, provisional application No. 63/242,308, filed on Sep. 9, 2021.

(51) Int. Cl.
*B01F 23/23* (2022.01)
*A47J 43/044* (2006.01)
(Continued)

(52) U.S. Cl.
CPC ......... *A47J 43/044* (2013.01); *A47J 43/0711* (2013.01); *A47J 43/082* (2013.01); *B01F 23/233* (2022.01); *B01F 23/2351* (2022.01); *B01F 23/236* (2022.01); *B01F 23/2363* (2022.01); *B01F 27/96* (2022.01); *B01F 35/2112* (2022.01); *B01F 35/2113* (2022.01); *B01F 35/2115* (2022.01); *B01F 35/212* (2022.01); *B01F 35/2209* (2022.01); *B01F 35/221422* (2022.01); *B01F 35/2215* (2022.01);

(Continued)

(58) Field of Classification Search
CPC ... B01F 23/236; B01F 23/233; B01F 23/2363
See application file for complete search history.

(56) References Cited

U.S. PATENT DOCUMENTS

| 4,893,940 | A | * | 1/1990 | Waisberg | ............ B01F 33/5011 |
| | | | | | 366/247 |
| 10,687,669 | B2 | * | 6/2020 | Kolar | .................. B01F 35/2214 |
| 2021/0196573 | A1 | * | 7/2021 | Wellach | ................ A61J 7/0481 |

FOREIGN PATENT DOCUMENTS

| CN | 202087267 U | * | 12/2011 |
| CN | 106040138 A | * | 10/2016 |

* cited by examiner

*Primary Examiner* — Robert A Hopkins
(74) *Attorney, Agent, or Firm* — Run8 Patent Group, LLC; Peter Miller; Leah Raddatz

(57) ABSTRACT

One variation of a mixing system includes: a container configured to store consumable beverages; a lid; and a mixer. The lid is configured to transiently couple to the container and includes: a housing; a mixer receptacle; a set of user controls arranged on an outer face of the lid; a set of electronics arranged within the housing and including a motor, a controller configured to actuate the motor responsive to selection of the set of user controls, and a power supply configured to supply power to the motor and the controller; and a set of supports arranged between the motor and walls of the housing and configured to absorb energy output by the motor. The mixer includes: a connector section configured to engage the mixer receptacle to couple the mixer to the motor; and a mixing section configured to mix ingredients in the container responsive to actuation of the motor.

20 Claims, 6 Drawing Sheets

(51) Int. Cl.
　　　*A47J 43/07* 　　(2006.01)
　　　*A47J 43/08* 　　(2006.01)
　　　*B01F 23/233* 　(2022.01)
　　　*B01F 23/235* 　(2022.01)
　　　*B01F 23/236* 　(2022.01)
　　　*B01F 27/96* 　　(2022.01)
　　　*B01F 35/21* 　　(2022.01)
　　　*B01F 35/212* 　(2022.01)
　　　*B01F 35/22* 　　(2022.01)
　　　*B01F 35/221* 　(2022.01)
　　　*B01F 35/32* 　　(2022.01)
　　　*B01F 35/30* 　　(2022.01)
　　　*B01F 101/14* 　(2022.01)

(52) U.S. Cl.
　　　CPC ...... *B01F 35/3204* (2022.01); *B01F 35/3214* (2022.01); *A47J 2043/04427* (2013.01); *B01F 2035/351* (2022.01); *B01F 2101/14* (2022.01)

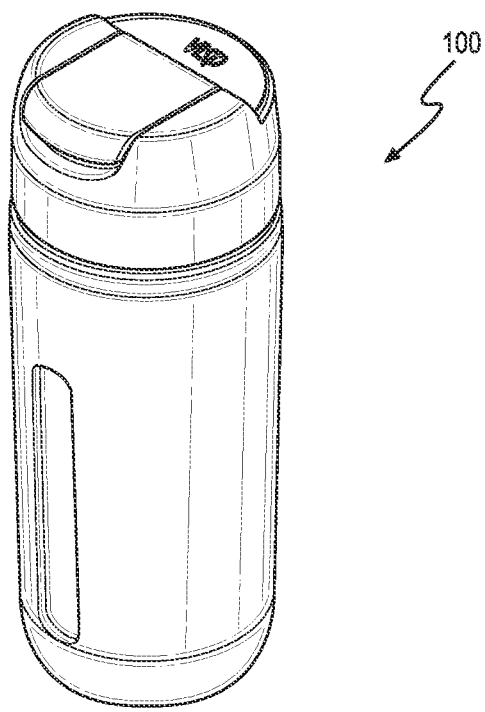
FIGURE 5
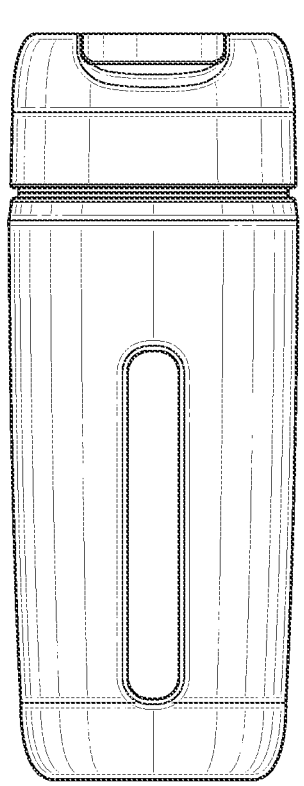 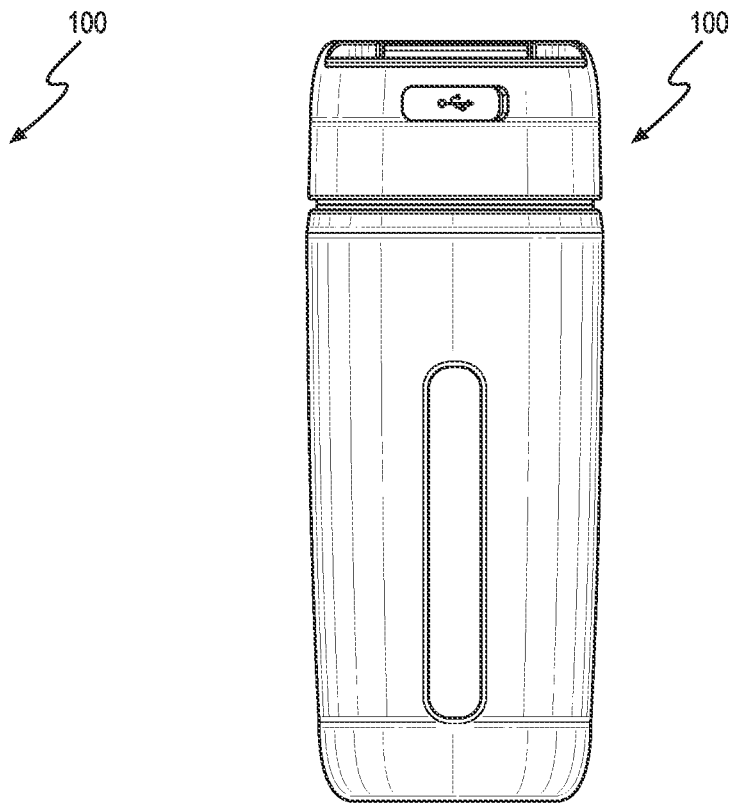
FIGURE 6A     FIGURE 6B

PORTABLE, BEVERAGE MIXING SYSTEM

CROSS-REFERENCE TO RELATED APPLICATIONS

This application claims the benefit of U.S. Provisional Application No. 63/346,659, filed on 27 May 2022, and U.S. Provisional Application No. 63/242,308, filed on 9 Sep. 2021, each of which is incorporated in its entirety by this reference.

TECHNICAL FIELD

This invention relates generally to the field of food processing and more specifically to a new and useful portable, beverage mixing system in the field of food processing.

BRIEF DESCRIPTION OF THE FIGURES

FIG. 5 is a schematic representation of one variation of the mixing system;

FIGS. 6A and 6B are schematic representations of one variation of the mixing system;

DESCRIPTION OF THE EMBODIMENTS

Figure 1A:
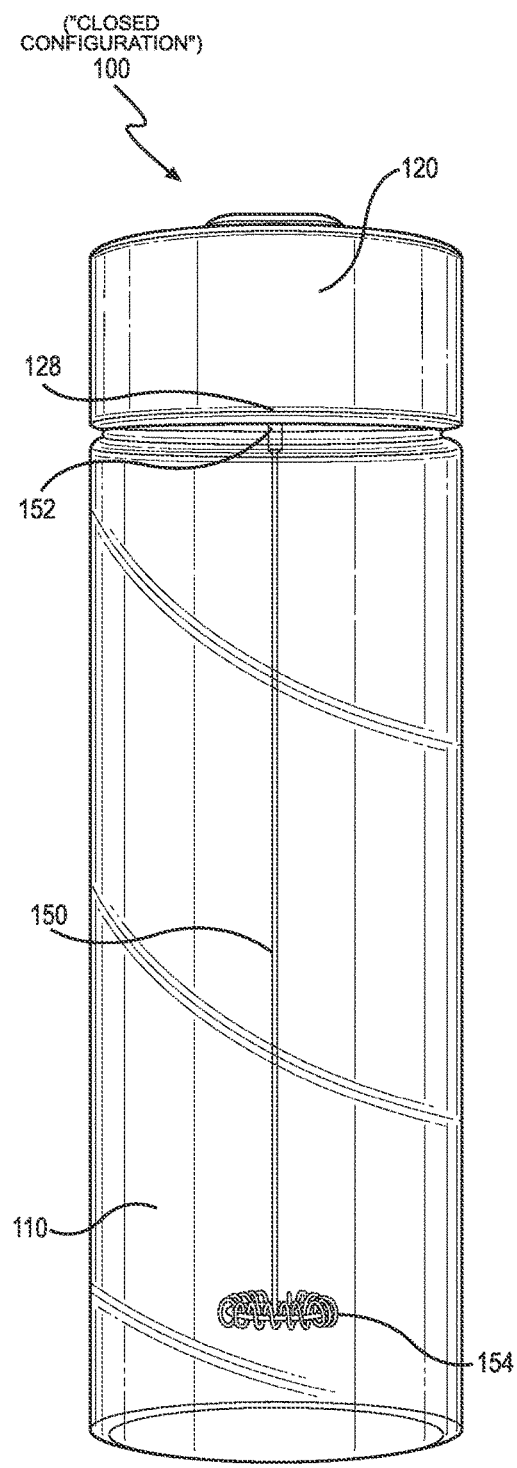
FIGS. 1A and 1B are schematic representations of a mixing system.
Figure 1B:
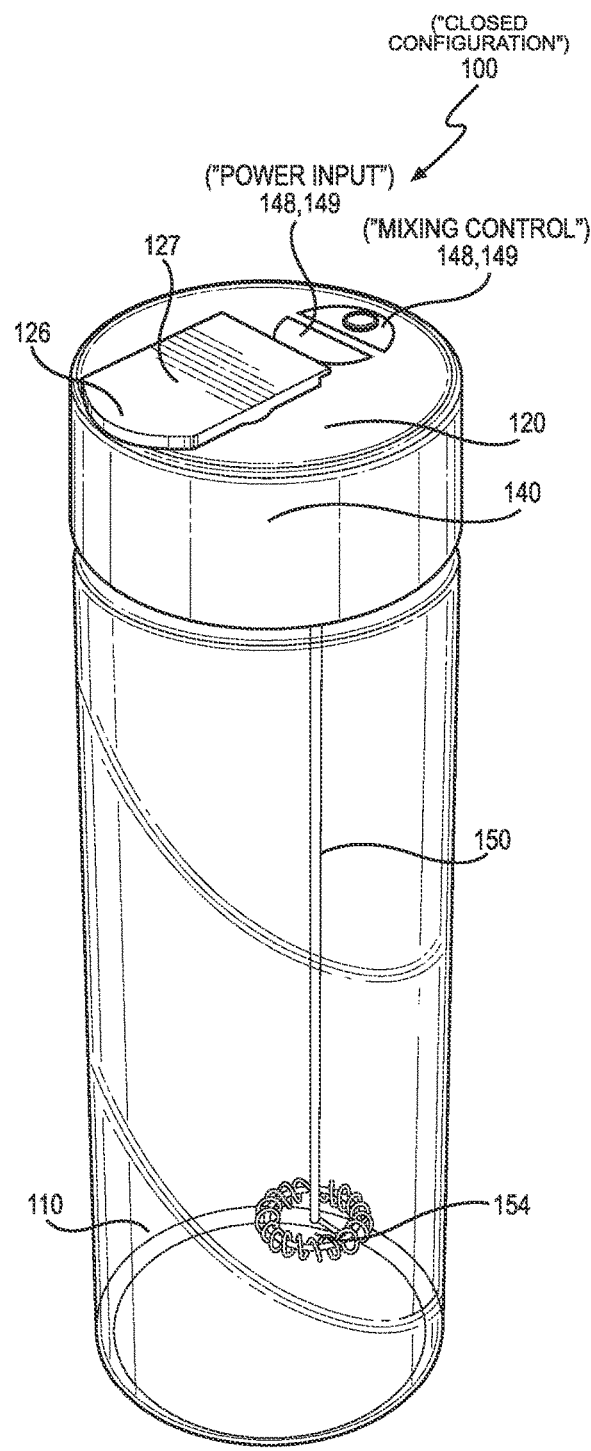

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Mixing System

As shown in FIGS. 1A, 1B, 2, 3, 4A, 4B, 5, 6A, 6B, 7A, 7B, 8A, and 8B, a mixing system 100 includes: a container 110 (e.g., a bottle, a cup); a lid 120; and a mixer 150.

The container 110 defines an inner bore configured for loading with consumable beverages (e.g., coffee, tea, juice, a matcha beverage, a protein shake).

The lid 120 is configured to transiently couple to the container 110 in a closed configuration and defines: an outer face 124 and an inner face 122 facing the inner bore in the closed configuration; and an opening 126 extending between the outer face 124 and the inner face 122 and configured to convey fluid from the inner bore into a mouth of a user. The lid 120 includes: a housing 130; a mixer receptacle 128 extending from the housing 130; a user interface 148 arranged on the outer face 124 and including a set of user controls 149; and a set of electronics 140 arranged within the housing 130. The set of electronics 140 includes: a motor 142 arranged within the housing 130 and coupled to the mixer receptacle 128; a controller 144 coupled to the motor 142 and configured to transiently actuate the motor 142 responsive to selection of the set of user controls 149 by the user; and a power supply 146 configured to supply power to the motor 142 and the controller 144. The lid 120 further includes a set of supports 132 (e.g., a gasket, a sleeve): arranged about the motor 142 within the housing 130; and configured to absorb energy (e.g., vibrations) output by the motor 142 to stabilize the motor 142 during actuation of the motor 142.

The mixer 150 includes: a connector section 152 configured to transiently engage the mixer receptacle 128 to mechanically couple the mixer 150 to the motor 142; and a mixing section 154 extending from the connector section 152; configured to seat along a central axis defined by the container 110 in the closed configuration; and configured to mix ingredients loaded within the inner bore of the container 110 to generate a homogenous mixture responsive to actuation of the motor 142.

In one variation, the mixing system 100 further includes a second mixer 150 including: a second connector section 152 configured to transiently engage the mixer receptacle 128 to mechanically couple the second mixer 150 to the motor 142; and a second mixing section 154 extending from the second connector section 152 along the central axis, configured to rotate about the central axis to mix ingredients loaded within the inner bore of the container 110 to generate a second homogenous mixture responsive to actuation of the motor 142, and including a second mixing head corresponding to a second beverage type. In this variation, the mixing section 154 includes a first mixing head corresponding to a first beverage type.

In one variation, the mixing system 100 further includes an air outlet 170 including: a channel extending between the inner face 122 and the outer face 124; and a pressure valve arranged within the channel and configured to occupy a closed state to prevent airflow through the channel and transition from the closed state to an open state to release air from within the container 110 to reduce pressure within the container 110 in response to pressure within the container 110 exceeding a threshold pressure.

One variation of the mixing system 100 includes: a container 110 configured to store consumable beverages and including a lid-receiving section 112; a lid 120; and a mixer 150. In this variation, the lid 120 defines: an outer face 124 and an inner face 122; an opening 126 extending between the outer face 124 and the inner face 122 and configured to convey liquid loaded within the inner bore into a mouth of a user; and a coupling section 134 configured to transiently mate with the lid-receiving section 112 to couple the lid 120 to the container 110. The lid 120 includes: a housing 130; a mixer receptacle 128 arranged proximal the housing 130; a set of user controls 149 arranged on the outer face 124; and a set of electronics 140 arranged within the housing 130 of the lid 120. In this variation, the set of electronics 140 includes: a motor 142 coupled to the mixer receptacle 128 and configured to rotate the mixer 150; a controller 144 configured to transiently actuate the motor 142 at a first speed, in the set of motor speeds, responsive to user selection of a first user control in the set of user controls 149; and a power supply 146 configured to supply power to the motor 142 and the controller 144. In this variation, the mixer 150 includes: a connector section 152 configured to transiently engage the mixer receptacle 128 to couple the mixer 150 to the motor 142; and a mixing section 154 configured to transiently mix ingredients loaded within the container 110 responsive to actuation of the motor 142.

In one variation, the mixing system 100 further includes a second mixing section 154. In this variation, the connector section includes an attachment receptacle. The first mixing section 154 includes: a first shaft section defining a first end and a second end configured to insert into the attachment receptacle to couple the first mixing section 154 to the connector section 152; and a first mixing head arranged on the first end of the first shaft section and configured to transiently mix ingredients loaded within the container 110 responsive to actuation of the motor 142. The second mixing section 154 includes: a second shaft section defining a first end and a second end configured to insert into the attachment receptacle to couple the second mixing section 154 to the connector section 152; and a second mixing head arranged on the first end of the second shaft section and configured to transiently mix ingredients loaded within the container 110 responsive to actuation of the motor 142.

In one variation, the mixing system 100 further includes a set of sensors 160 configured to record a set of controls (e.g., temperature, pressure, liquid fill level) within the container 110. In this variation, the controller 144 is configured to actuate the motor 142 based on the set of controls and responsive to selection of the set of user controls 149.

One variation of the mixing system 100 includes: a container 110 configured for loading with consumable beverages and including a lid-receiving section 112; a lid 120; and a first mixer 150 in a set of mixers 150; and a second mixer 150 in the set of mixer 150. In this variation, the lid 120 defines: an outer face 124 and an inner face 122; an opening 126 extending between the outer face 124 and the inner face 122 and configured to convey liquid loaded within the container 110 into a mouth of a user; and a coupling section 134 configured to transiently mate with the lid-receiving section 112 to couple the lid 120 to the container 110 in a closed configuration. The lid 120 includes: a mixer receptacle 128 arranged on the inner face 122; a housing 130 arranged proximal the mixer receptacle 128; a set of user controls 149 arranged on the outer face 124; and a set of electronics 140 arranged within the housing 130. In this variation, the set of electronics 140 includes: a motor 142 coupled to the mixer receptacle 128 and defining a set of motor speeds; a controller 144 coupled to the motor 142 and configured to transiently actuate the motor 142 responsive to selection of the set of user controls 149; and a power supply 146 configured to supply power to the motor 142 and the controller 144. The first mixer 150 includes: a first connector section 152 configured to transiently engage the mixer receptacle 128 to couple the first mixer 150 to the motor 142; and a first mixing section 154 extending from the inner face 122 of the lid 120 into the container 110, defining a second height less than the first height of the container 110, and configured to mix ingredients corresponding to a first beverage type and loaded within the container 110 responsive to actuation of the motor 142. The second mixer 150 includes: a second connector section 152 configured to insert into the mixer receptacle 128 to couple the second mixer 150 to the motor 142; and a second mixing section 154 extending from the inner face 122 of the lid 120 into the container 110, defining a third height less than the first height of the container 110, and configured to mix ingredients corresponding to a second beverage type and loaded within the container 110 responsive to actuation of the motor 142.

One variation of the mixing system 100 includes: a container 110; a lid 120; and a mixer 150. In this variation, the container 110: defines a first height; defines a lid-receiving section 112 (e.g., a threaded section); and is configured to hold consumable beverages. The lid 120 defines: an opening 126 (e.g., a spout) extending between an outer face 124 of the lid 120 and an inner face 122 of the lid 120 and configured to transport liquids contained within the container 110 into a user's mouth; a coupling section 134 configured to couple with the lid-receiving section 112 of the container 110 to couple the lid 120 with the container 110; and a mixer receptacle 128. The lid 120 includes a housing 130 configured to store a set of electronic components including: a motor 142 coupled to the mixer receptacle 128 and defining a set of mixing speeds; a controller 144 configured to transiently actuate the motor 142; and a power supply 146 (e.g., a battery) configured to supply power to the motor 142 and the controller 144. The mixer 150 is configured to transiently mix ingredients loaded in the container 110 to generate a homogenous mixture. The mixer 150 defines: a first section (e.g., an insert section) configured to transiently insert into the mixer receptacle 128 to mechanically couple the mixer 150 to the motor 142; and a second section (e.g., a mixing section 154) extending from the inner face 122 of the lid 120 into the container 110 and defining a second height less than the first height of the container 110.

2. Applications

Generally, the mixing system 100 includes: a portable, handheld beverage container 110 (hereinafter a "container 110") configured to hold a range of beverages (e.g., hot coffee, cold coffee, tea, broth, juice, smoothies, slushies); a lid 120—including a motor 142 and a power supply 146 (e.g., a battery)—removably coupled to the container 110 and configured to enable a user to drink contents of the container 110 without spilling; and a mixer 150, removably coupled to the lid 120, such that when the mixer 150 is coupled to the lid 120, the mixer 150 is mechanically coupled to the motor 142 in the lid 120 and extends downward from the lid 120 into the container 110.

Therefore, when the container 110 is filled with liquid and/or other ingredients, the mixer 150 is submerged in the liquid. When the motor 142 is then actuated, the mixer 150—mechanically coupled to the motor 142—stirs (e.g., mixes, blends) the liquid and other ingredients in the container 110 to constitute a homogenous mixture (e.g., exhibiting a uniform distribution of ingredients within the liquid).

The mixing system 100 can therefore transform a nonhomogeneous mixture (or "settled mixture")—exhibiting a nonuniform distribution of ingredients within the liquid (e.g., due to accumulation or separation of ingredients from the liquid)—into this homogenous mixture. The mixing system 100 can then semi-continuously and/or intermittently actuate the motor 142 to maintain this homogenous mixture over time. A user may then drink this homogenous mixture (e.g., a homogenous coffee beverage, smoothie, slushy, broth, juice)—such as over a duration of a meal, a workout, or a workday—and experience a consistent taste and texture while drinking each sip of the homogenous mixture throughout this duration.

For example, in the morning, a user may fill the container 110 with a mixture including coffee and other ingredients such as: sugar; creamer; and/or added nutritional supplements (e.g., protein powder or collagen powder). The user may attach a mixer 150 to the lid 120 and couple the lid 120 to the container 110, such as by screwing or snapping the lid 120 onto the container 110. The user may then selectively actuate the mixer 150—such as by manually selecting a "mix" button 149 located on the lid 120—to periodically mix the coffee and other ingredients within the container 110 in order to maintain a homogenous mixture, such as excluding accumulation of solid (e.g., sugar, nutritional supplements) at a bottom or top of the container 110 and/or separation of ingredients.

In this example, the "mix" button 149 can be located in a particular position on the lid 120—such as proximal the user's thumb or index finger while the user is holding the container 110 and/or lid 120 (e.g., in her palm with her fingers wrapping around the container 110 and/or lid 120)—such that the user may depress (or "push") the "mix" button to mix (e.g., stir, blend) her beverage without setting down the container 110 or requiring two hands to both hold and operate the mixing system 100. The user may therefore mix her beverage (e.g., before or after drinking from the container 110)—during her commute to work, while working at her desk or walking around her office, and/or while carrying her beverage in one hand and work materials in the other—to constitute and/or maintain a homogenous coffee beverage. The user can then continue to drink this homogenous coffee beverage throughout the work day and experience a consistent (e.g., identical), uniform, taste and texture across an entire volume of her beverage from the morning through the afternoon.

3. Beverage Container

The mixing system 100 includes a handheld, portable beverage container 110 configured to: hold a range of consumable beverages (e.g., hot and cold, low-viscosity and high-viscosity, and/or homogenous and nonhomogeneous beverages) for drinking by a user. Generally, the container 110: defines a cavity—formed by walls of the container 110—exhibiting a particular height and volume and configured to hold a liquid mixture (i.e., beverage); and includes a lid-receiving section 112 (e.g., a threaded section for screwing on the lid 120) configured to accept and retain a lid 120 transiently coupled to the container 110 and including a mixer 150 extending down from the lid 120 into the cavity of the container 110.

The container 110 can be formed of a water-proof material, such as: glass; ceramic; and/or stainless steel.

4. Lid

The mixing system 100 includes a lid 120 configured to accept and retain a mixer 150 and transiently couple with the container 110 to: securely contain contents (e.g., liquid beverages) of the container 110 (e.g., with no leakage) while enabling the user to drink contents of the container 110 without removing the lid 120; and transiently actuate the mixer 150, extending into the container 110, to mix contents (e.g., liquid and/or solid ingredients) of the container 110.

In particular, the lid 120 defines: an opening 126 (e.g., a spout)—through which a user may drink her beverage contained within the container 110—extending between an outer face 124 of the lid 120 (e.g., facing outward from the container 110) and an inner face 122 of the lid 120 (e.g., facing inward into the container 110); a coupling section 134 (e.g., a snap on or screw on mechanism) configured to couple with the lid-receiving section 112 of the container 110 to couple the lid 120 with the container 110; and a mixer receptacle 128 configured to receive a first end of a mixer 150 (e.g., a whisk) to couple the mixer 150 with the lid 120.

Further, the lid 120 includes a set of electronics 140 including: a motor 142 mechanically coupled to the mixer receptacle 128 and configured to transiently actuate the mixer 150 when loaded in the mixer receptacle 128; and a power supply 146 (e.g., a battery) configured to supply power to the motor 142. The lid 120 can also include a charger inlet 136 (e.g., a micro-USB or USB-c inlet) such that the user may recharge the battery during and/or after use of the container 110.

Figure 2:
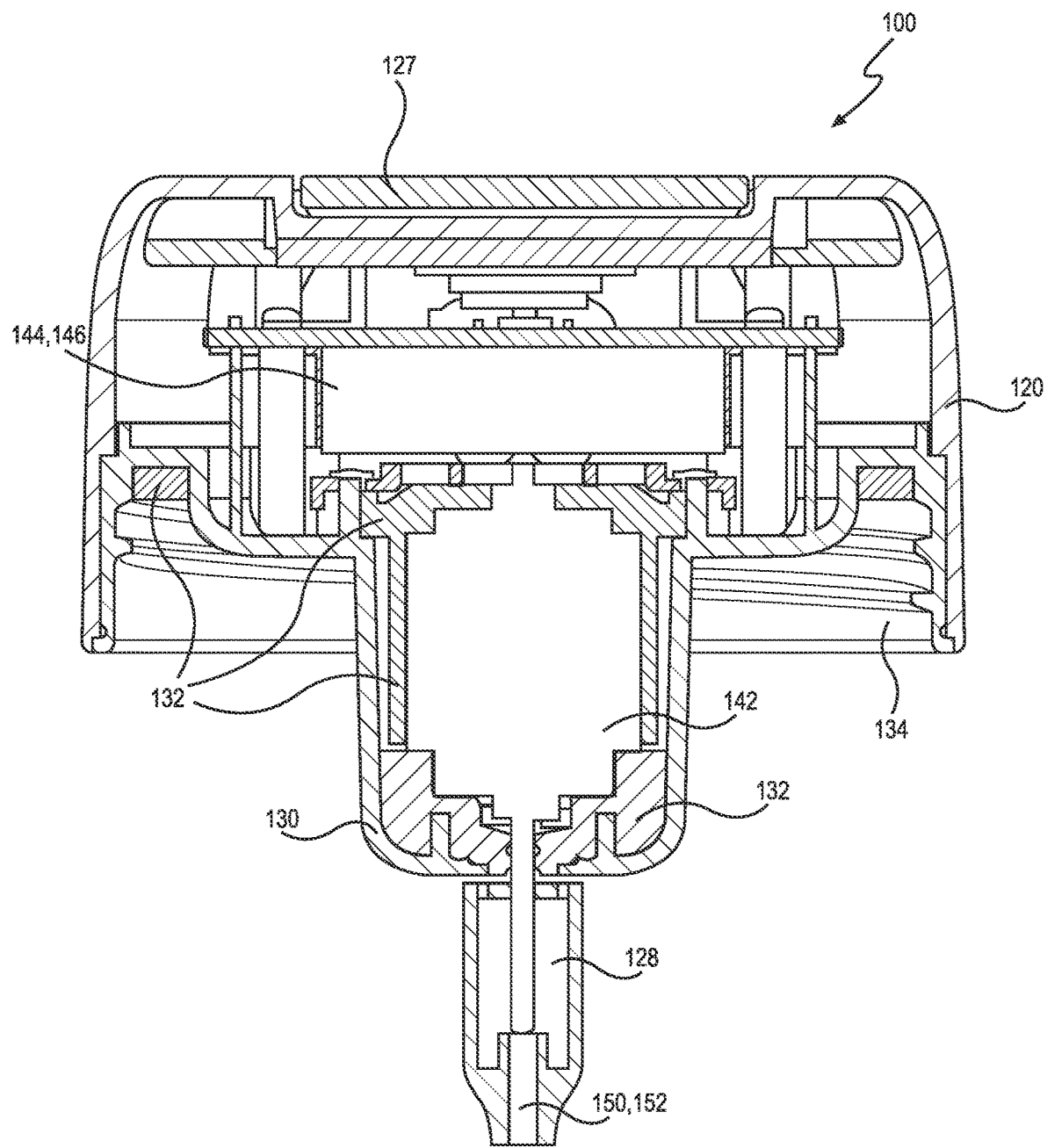
FIG. 2 is a schematic representation of one variation of the mixing system.
Figure 3:
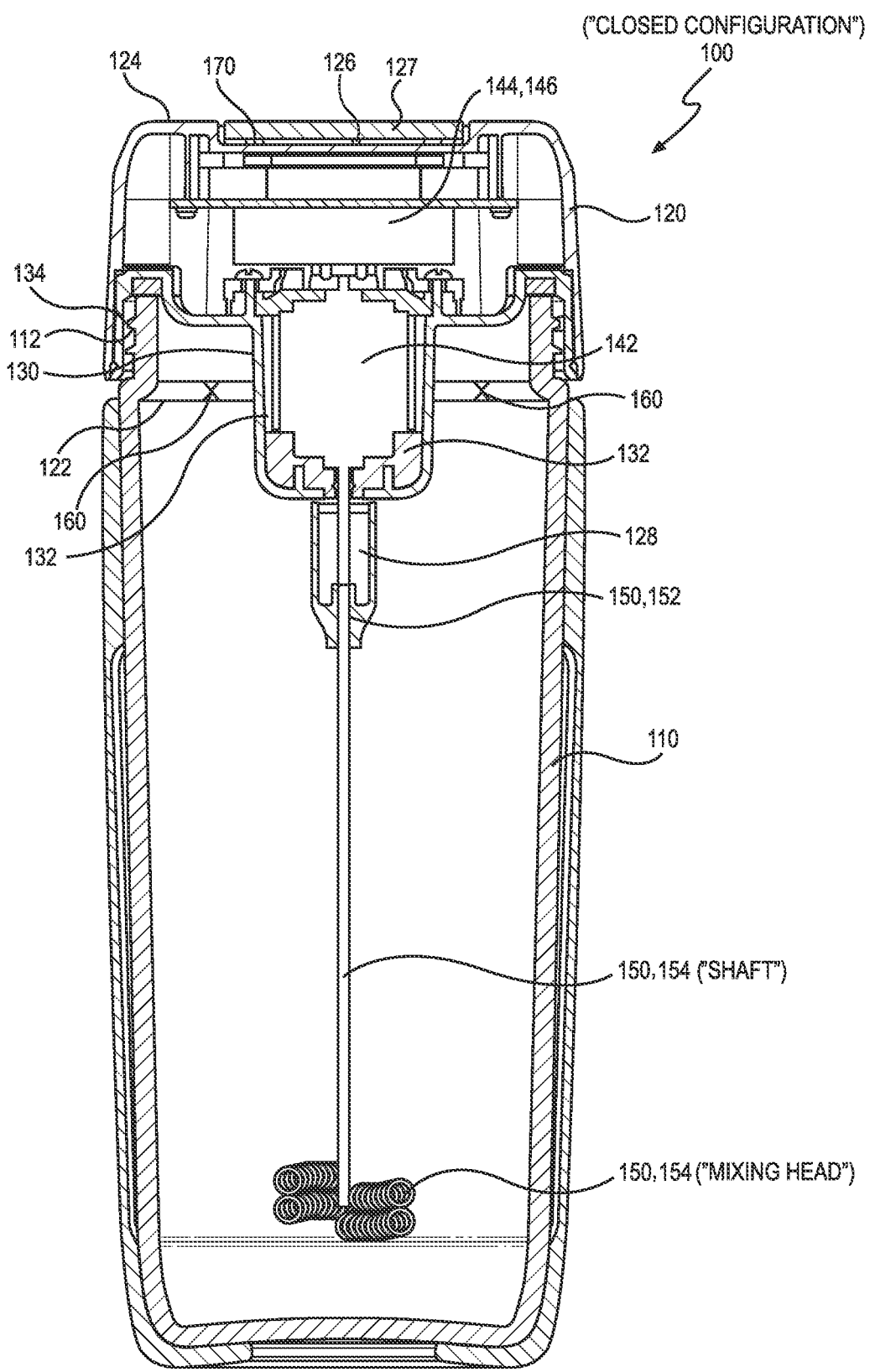
FIG. 3 is a schematic representation of one variation of the mixing system.
Figure 4A:
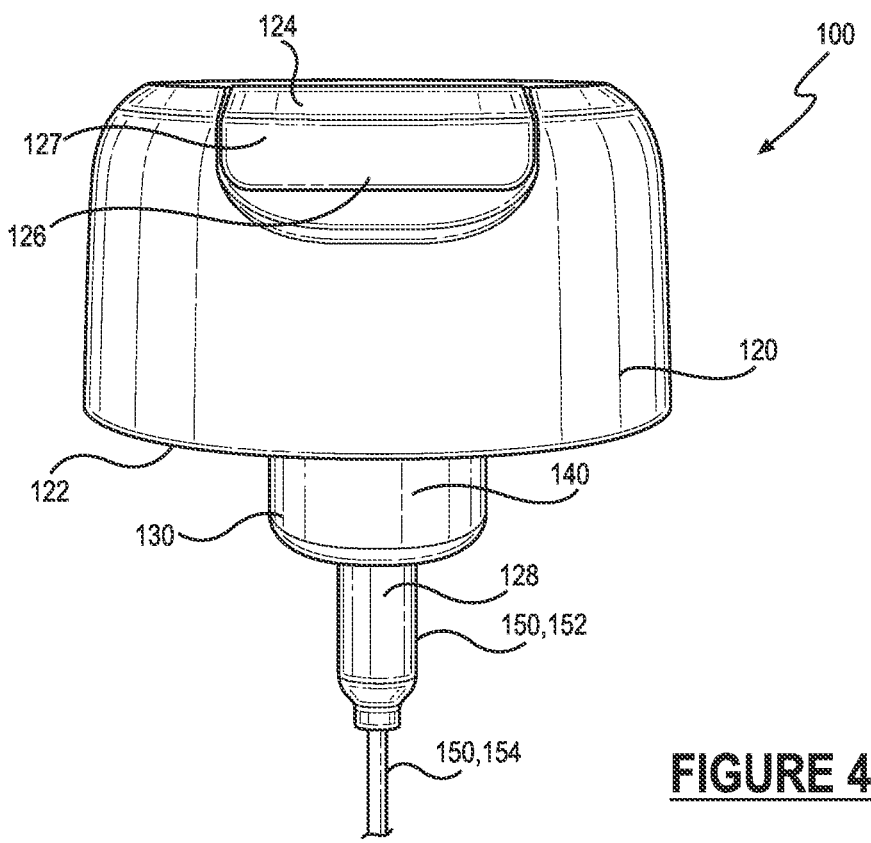
FIGS. 4A and 4B are schematic representations of one variation of the mixing system.
Figure 4B:
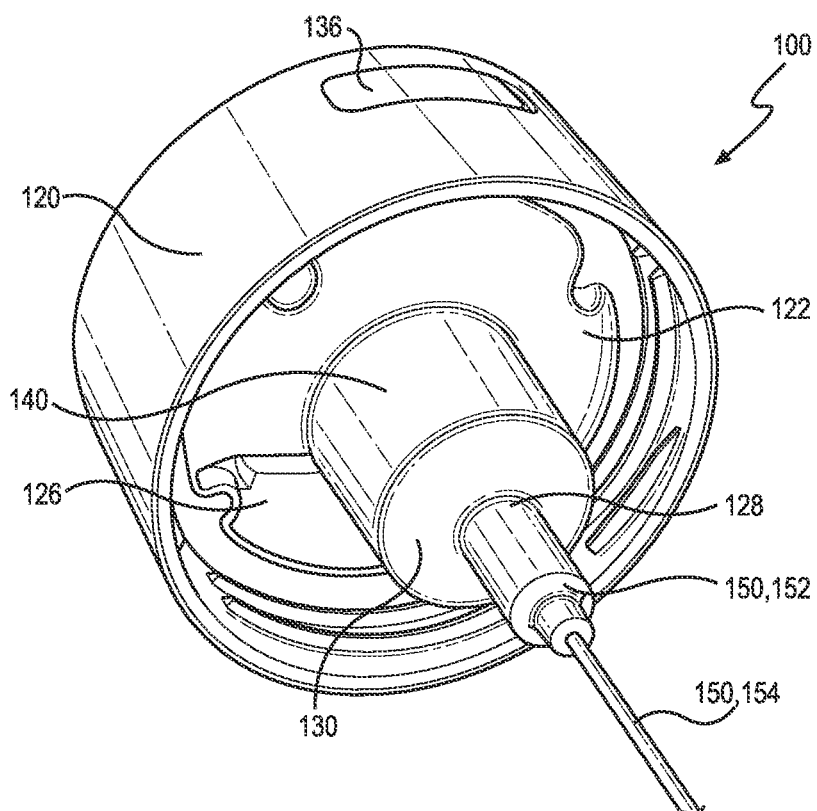
Figure 7A:
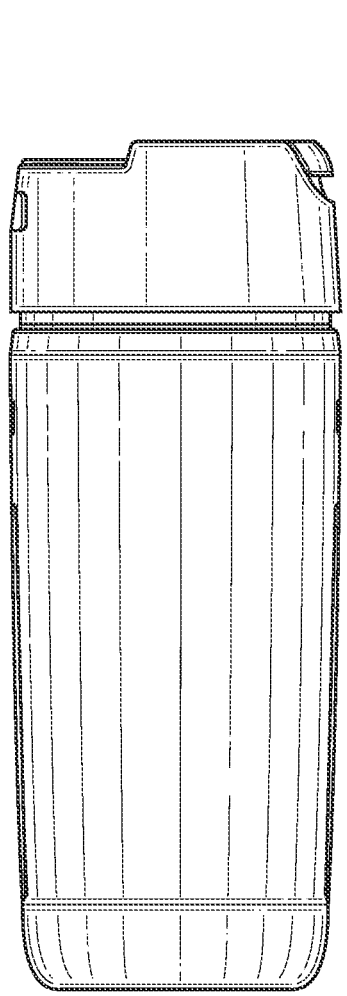
FIGS. 7A and 7B are schematic representations of one variation of the mixing system.
Figure 7B:
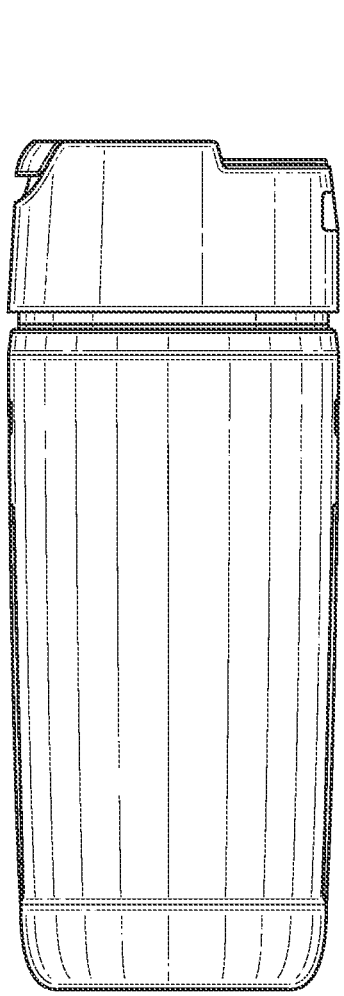
Figure 8A:
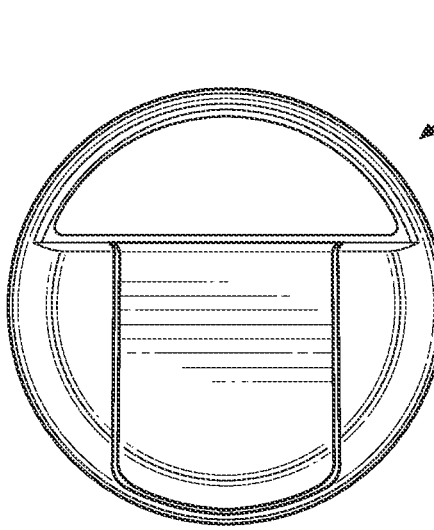
FIGS. 8A and 8B are schematic representations of one variation of the mixing system.
Figure 8B:
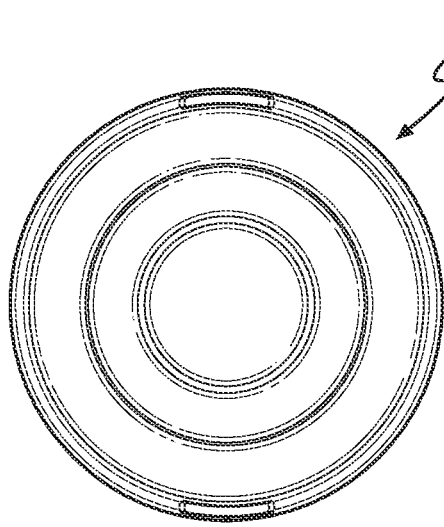

As shown in FIGS. 2, 3, and 4B, the lid 120 can include a housing 130 (e.g., a waterproof housing 130) integrated within the lid 120 and configured to house the set of electronics 140, thereby minimizing wear and tear to the electronics over time, such as due to contact with liquid in the container 110 or cleaning of the lid 120 by the user.

The lid 120 can also include a set of indicators and/or user controls—such as including a power control and/or a set of mixing controls—arranged on the outer face 124. In particular, in one implementation, the lid 120 can include: a power input (e.g., a power button) configured to power the mixing system 100 on and off responsive to user inputs; a battery indicator configured to indicate a remaining battery life of the battery in the lid 120; a motor indicator configured to signal actuation and deactivation of the motor 142; and/or a set of mixing controls configured to control actuation of the motor 142—and thereby the mixer 150— responsive to user inputs.

4.1 User Interface

The lid 120 can include a user interface 148 arranged on the outer face 124—such that the user interface 148 is accessible to the user when the lid 120 is in the closed configuration (e.g., coupled to the container 110)— and including a set of user controls 149 configured to receive user inputs and/or selections by the user. The user interface 148 can also include a set of indicators—such as a set of LED lights and/or digital icons—each indicator, in the set of indicators, configured to indicate a particular condition of a component of the mixing system 100, such as remaining battery life of the power supply 146, whether the motor 150 is currently active and/or deactivated, whether power is currently on or off in the lid 120, etc.

In one implementation, the set of user controls 149 can include: a first user control (e.g., a selectable push-button or a selectable icon) corresponding to a first blend setting—such as a first mix speed, a first mix duration, a first frequency of mixing pulses (e.g., once per second, once per five-second interval, once per ten-second interval), and/or a first mix protocol defined for a first beverage type (e.g., a hot or cold beverage, a high-viscosity or low-viscosity beverage, a particular beverage)—in a set of blend settings defined for the motor 142; and a second user control corresponding to a second blend setting—such as a second mix speed, a second mix duration, a second frequency of mixing pulses, and/or a second mix protocol defined for a second beverage type—in the set of blend settings defined for the motor 142. In this implementation, the controller 144 can be configured to: actuate the motor 142 according to the first blend setting responsive to selection of the first user control (e.g., by the user); and actuate the motor 142 according to the second blend setting responsive to selection of the second user control by the user. Further, the set of user controls 149 can include additional user controls 149, such as a third user control, in the set of user controls 149, corresponding to a third blend setting, a fourth user control, in the set of user controls 149, corresponding to a fourth blend setting, a fifth user control, in the set of user controls 149, corresponding to a fifth blend setting, etc.

For example, the user interface 148 can include a set of user controls 149 arranged on the outer face 124 of the lid 120 and configured to trigger actuation of the motor 142 responsive to selection (e.g., clicks or taps) of the set of user controls 149. In this example, the motor 142 can be configured to rotate the mixer 150 according to a set of blend settings defined for the motor 142 and corresponding to different types of beverages—such as hot, cold, low-viscosity, and/or high-viscosity beverages, beverages including a particular ingredient or ingredient type, a particular beverage (e.g., coffee, tea, shake, juice, smoothie)—each blend setting, in the set of blend settings, linked to a particular user control in the set of user controls 149. In particular, the set of user controls 149 can include: a first user control (e.g., a first button) linked to a first blend setting, in the set of blend settings, corresponding to beverages of a first beverage type defining a first target temperature and/or a first target viscosity; and a second user control (e.g., a second button) linked to a second blend setting, in the set of blend settings, corresponding to beverages of a second beverage type defining a second target temperature and/or a second target viscosity. In this example, the controller 144 is configured to actuate the motor 142 according to a first mixing protocol—responsive to selection of the first user control—configured to: regulate temperature of a first beverage—of the first beverage type and loaded in the container 110—within a first threshold deviation of the first target temperature; and regulate viscosity of the first beverage in the container 110 within a second threshold deviation of the first target viscosity. Further, the controller 144 is configured to actuate the motor 142 according to a second mixing protocol—responsive to selection of the second user control—configured to: regulate temperature of a second beverage—of the second beverage type and loaded in the container 110—within a third threshold deviation of the second target temperature; and regulate viscosity of the beverage in the container 110 within a fourth threshold deviation of the second target viscosity.

Alternatively, in another implementation, the user interface 148 can include the set of user controls 149 including a single user control configured to selectively trigger actuation of the motor 142 responsive to user inputs at this single user control.

For example, the user interface 148 can include a first user control configured to receive user inputs of different durations, each duration corresponding to a particular blend setting for actuation of the motor 142. In particular, in this example, the user control can define: a first input type of a first duration (e.g., less than 1 second) corresponding to a first blend setting (e.g., a first mix speed and/or first mix duration); and a second input type (e.g., 3 seconds) of a second duration corresponding to a second blend setting (e.g., a second mix speed and/or second mix duration). In one example, the lid 120 can include a user control corresponding to mixing speed. In this example, the controller 144 can be configured to: track a duration of a user selection at the first user control; and actuate the motor 142 at a particular mixing speed, in a set of mixing speeds (e.g., defined for the motor 142) based on the duration.

Additionally and/or alternatively, the user interface 148 can include a first user control configured to receive a quantity of user inputs (e.g., within a threshold duration) linked to a particular blend setting. For example, the first user control can define: a first quantity of inputs—such as a single click on the first user control—corresponding to a first blend setting; and a second quantity of inputs—such as a double click on the first user control—corresponding to a second blend setting. In one example, the lid 120 can include a user control corresponding to mixing speed. In this example, the controller 144 can be configured to: track a quantity of selections entered by the user at the user control within a set duration, such as in response to detecting an initial input at the user control; and actuate the motor 142 at a particular mixing speed, in a set of mixing speeds (e.g., defined for the motor 142) based on the quantity of selections.

4.2 Power Supply

The lid 120 can include a power supply 146 (e.g., a battery)—arranged within the housing 130—configured to supply power to the motor 142 and/or the controller 144. The power supply 146 can also be configured to supply power to the user interface 148 including the set of user controls 149 and/or indicators (e.g., a set of LED lights).

The lid 120 can also include a charger inlet 136 (or "charge receptacle" 136) (e.g., a micro-USB or USB-c inlet), configured to transiently receive a charge connector electrically coupled to an external power supply to electrically couple the external power supply to the power supply 146 within the lid 120 during a charge cycle, such that the user may recharge the battery during and/or after use of the container 110.

In one implementation, the controller 144 can be configured to disable actuation of the motor 142 during a charge cycle (e.g., during charging of the power supply 146). For example, the controller 144 can be configured to automatically disable (or "deactivate") actuation of the motor 142 responsive to detection of the charge connector within the charge receptacle 136. In this example, the controller 144 can be configured to reactivate actuation of the motor 142 responsive to removal of the charge connector from the charge receptacle 136.

4.3 Pressure Release

In one implementation, the lid 120 can include an air outlet 170 configured to release air from within the container 110 based on interior pressure within the container 110.

For example, the lid 120 can include an air outlet 170 including: a channel extending between the inner face 122 and the outer face 124 of the lid 120; and a pressure valve arranged within the channel. In this example, the pressure valve can be configured to: occupy a closed state (e.g., a default state) to prevent airflow through the channel; and transition from the closed state to an open state to release air from within the container no and reduce pressure within the container 110, such as in response to pressure within the container 110 exceeding a threshold pressure. In this example, the mixing system 100 can therefore automatically release air from the container 110 to reduce pressure responsive to increased pressure (e.g., above a threshold pressure) within the container 110.

Additionally and/or alternatively, in another example, the opening 126—extending between the outer face 124 and the inner face 122 and configured to convey fluid from the inner bore into a mouth of a user—can be configured to release air from the container 110. In particular, in one example, the lid 120 can include a cover 127 (e.g., a spout cover): configured to seat over (e.g., covering) the opening 126—such that no fluid (e.g., air and/or liquid) is released from the container 110—in a closed position; and configured to rotate into an open position to enable fluid flow out of the container 110. In this example, the cover 127 (e.g., a "flip cap") can be configured to automatically transition from the closed position to the open position in response to an interior pressure within the container 110 exceeding a threshold pressure. Additionally, in this example, the user may manually open and close the cover 127 to both control liquid flow (e.g., flow of the user's beverage) out of the opening 126 and to reduce pressure within the container 110.

4.4 Motor

The mixing system 100 can include a motor 142 arranged within the housing 130 and coupled to the mixer receptacle 128. In particular, the motor 142 is configured to rotate the mixer 150—coupled to the mixer receptacle 128—such as according to a set of blend settings (e.g., a speed and/or duration of mixing).

In one implementation, as shown in FIGS. 2 and 3, the motor 142 is mechanically coupled to a driveshaft defining an axis coaxial a central axis of the container 110 (e.g., in the closed configuration). The mixer receptacle 128 is mechanically coupled to the driveshaft—below the motor 142 within the housing 130—such that actuation of the motor 142, by the controller 144, rotates the driveshaft, thereby rotating components of the mixer receptacle 128, transiently coupled to the connector section 152 of the mixer 150. For example, the mixer receptacle 128 can define a set of wings—mechanically coupled to the driveshaft—and configured to rotate about the central axis responsive to actuation of the motor 142. The connector section 152 of the mixer 150 can be configured to transiently engage the set of wings—such as by inserting the connector section 152 over the set of wings within the mixer receptacle 128—and therefore couple to the motor 142. In this example, the controller 144 can actuate the motor 142 to rotate the driveshaft about the central axis, thereby rotating the set of wings about the central axis, and thus rotating the mixer 150 about the central axis to mix ingredients loaded within the container 110.

4.4.1 Flexible Supports: Mixer Stability

In one implementation, as shown in FIG. 2, the lid 120 can include a set of supports 132 (e.g., a set of dampers) arranged about the motor 142 and configured to stabilize rotation of the mixer 150. In particular, the lid 120 can include a set of supports 132 (e.g., flexible supports)—such as a gasket and/or sleeve formed of a flexible material (e.g., silicone)—arranged between inner walls of the housing 130 and surfaces of the motor 142 and configured to flexibly constrain the motor 142 within the housing 130. By thus flexibly retaining the motor 142 within the housing 130—rather than rigidly coupling the motor 142 to the housing 130—the set of supports 132 can enable movement of the motor 142 responsive to rotation of the mixer 150, thereby: limiting vibration of the mixer 150 during rotation due to imbalances between the mixer 150 and the motor 142; constraining axial rotation of the mixer 150 about a fixed axis (i.e., the central axis) extending vertically along a center of the cup; reduce risk of failure of the motor 142 and/or mixer 150, such as due to contact of the mixing section 154 with inner walls of the container 110 and/or bending of the mixing section 154.

In this implementation, the set of supports 132 can therefore be configured to absorb energy output by the motor 142 to reduce vibration of the motor 142 and constrain displacement of the mixer 150 from the central axis, such as during rotation of the mixer 150 responsive to actuation of the motor 142. In particular, the connector section 152 of the mixer 150 can be configured to transiently engage the mixer receptacle 128 to: couple the mixer 150 to the motor 142; and locate the mixing section 154 coaxial the driveshaft (e.g., within the container 110) and along the central axis. The mixing section 154 can define a distal end—opposite the connector section 152— configured to seat within contents (e.g., liquid and/or ingredients) of the container 110. During actuation of the motor 142, the set of supports 132—arranged about the motor 142 within the housing 130—can: reduce vibrations of the motor 142, the driveshaft, the mixer receptacle 128, and/or the mixer 150 by absorbing energy output by the motor 142; and therefore constrain displacement of the distal end of the mixer 150 from the central axis (e.g., to within a threshold distance), thereby constraining rotation of the mixer 150 within a threshold distance of the central axis.

For example, the lid 120 can include one or more silicone gaskets (e.g., one or more gaskets formed of a silicone material)—arranged between the inner walls of the housing 130 and surfaces of the motor 142—of a particular thickness (e.g., one-millimeter thickness, three-millimeter thickness) and exhibiting a relatively low shore hardness. In this example, the mixing system 100 can include a metal mixer 150 (e.g., a mixer 150 formed of a metal material) coupled to the motor 142 and configured to rotate axially about a center axis of the cup to mix contents of the cup. During axial rotation of the metal mixer 150, the silicone gaskets can be configured to enable movement (e.g., gyroscopic movement, precession) of the motor 142 within the housing 130 in order to counterbalance vibrational forces due to rotation of the mixer 150, thereby limiting displacement of the mixer 150 from the center axis and thus maintaining the mixer 150—and more specifically the mixing section 154 of the mixer 150—within a threshold distance of the center axis.

5. Mixer

The mixing system 100 includes a removable mixer 150 configured to mix contents of the container 110. Generally, the mixer 150 defines: an insert section configured to transiently engage the mixer receptacle 128 to mechanically couple the mixer 150 to the motor 142; and a mixing section 154 (e.g., a frother, a whisk, a blending blade) configured to mix liquids within the container 110 via actuation of the motor 142 mechanically coupled to the mixer 150 when attached to the lid 120. The mixer 150 can be configured to extend downward to a particular depth within the container 110 (e.g., 1 centimeter, 2 centimeters, or 5 centimeters from a bottom surface of the container 110), such that the mixer 150 does not contact a bottom surface of the container 110 while enabling mixing of liquids at a relatively low fill level within the container 110. In one implementation, the mixer 150 is formed a metal material. However, the mixer 150 can be formed of any other type of material (e.g., bamboo, plastic, metal).

Additionally and/or alternatively, in another variation, the mixer 150 section can be removably coupled to the mixer 150, such that mixer 150 is configured to receive a set of mixing sections 154 (e.g., a frother attachment, a whisk attachment, a blending attachment), each mixing section 154, in the set of mixing sections 154, corresponding to a particular beverage type.

5.1 Suite of Mixers

In one variation, the mixing system 100 can include a set of mixers 150, such as a suite of mixers 150 corresponding to containers 110 of different heights and/or corresponding to different beverage types.

In one implementation, the mixing system 100 can include a set of mixers 150, each mixer 150, in the set of mixers 150, defining a particular mixer height, in a set of mixer heights, corresponding to a height of a container 110. For example, the mixing system 100 can include: a first container 110 defining a first height; and a second container 110 defining a second height. In this example, the mixing system 100 can further include: a first mixer 150, in the set of mixers 150, defining a first mixer height less than and corresponding to the first height of the first container 110; and a second mixer 150, in the set of mixers 150, defining a second mixer height less than and corresponding to the second height of the second container 110. The first mixer 150 can therefore be configured for mixing ingredients loaded in the first container 110 of the first height and the second mixer 150 can be configured for mixing ingredients loaded in the second container 110 of the second height.

Additionally and/or alternatively, in another implementation, the mixing system 100 can include a set of mixers 150, each mixer 150, in the set of mixers 150, corresponding to a particular beverage type. For example, the mixing system 100 can include different mixers 150 for: hot beverages (e.g., above a threshold temperature); cold beverages (e.g., below a threshold temperature); thin drinks (e.g., below a threshold viscosity); thick drinks (e.g., above a threshold viscosity); etc.

In particular, in the preceding implementation, the mixing system 100 can include a set of mixers 150 including: a first mixer 150 corresponding to a first beverage type; and a second mixer 150 corresponding to a second beverage type. The first mixer 150 can include: a first connector section 152 configured to transiently engage the mixer receptacle 128 of the lid 120 to couple the first mixer 150 to the motor 142; and a first mixing section 154 configured to mix ingredients—corresponding to the first beverage type (e.g., during a first time period) and loaded within the container 110—responsive to actuation of the motor 142. The second mixer 150 can include: a second connector section 152 configured to insert into the mixer receptacle 128 to couple the second mixer 150 to the motor 142; and a second mixing section 154 configured to mix ingredients—corresponding to the second beverage type and loaded within the container 110 (e.g., during a second time period)—responsive to actuation of the motor 142. In this implementation, the set of mixers 150 can similarly include: a third mixer 150, in the set of mixers 150, corresponding to a second beverage type; a fourth mixer 150, in the set of mixers 150, corresponding to a fourth beverage type; a fifth mixer 150, in the set of mixers 150, corresponding to a fifth beverage type; etc. The user may therefore: insert the first mixer 150 into the mixer receptacle 128 of the lid 120 to mix beverages of the first beverage type loaded in the container 110; and insert the second mixer 150 into the mixer receptacle 128—in replacement of the first mixer 150 and/or another mixer 150 in the set of mixers 150—to mix beverages of the second beverage type.

For example, the first mixer 150 can include the first mixing section 154 including: a first shaft section defining a first end coupled to the first connector section 152; and a first mixing head (e.g., a frother, a whisk, a paddle) corresponding to the first beverage type—such as a frother configured to aerate beverages of the first beverage type— and coupled to the first shaft section opposite the first connector section 152. The second mixer 150 can include the second mixing section 154 including: a second shaft section defining a second end coupled to the second connector section 152; and a second mixing head corresponding to the second beverage type—such as a whisk configured to blend beverages of the second beverage type—and coupled to the second shaft section opposite the second connector section 152.

Additionally and/or alternatively, in another variation, the mixing system 100 can include multiple mixing sections 154 configured to transiently couple to the connector section 152 of the mixer 150. In particular, in this variation, the mixing system 100 can include: a connector section 152—including an attachment receptacle—configured to transiently engage the mixer receptacle 128 to couple a particular mixing section 154, in a set of mixing sections 154, to the motor 142 and locate the particular mixing section 154 along the central axis of the container 110; a first mixing section 154 in the set of mixing sections 154— such as corresponding to a first beverage type and/or a first container 110 height— configured to transiently engage the attachment receptacle to couple to the connector section 152 and thus mix ingredients loaded within the container 110; and a second mixing section 154 in the set of mixing sections 154—such as corresponding to a second beverage type and/or a second container 110 height—configured to transiently engage the attachment receptacle to couple to the connector section 152 (e.g., in replacement of the first mixing section 154) and thus mix ingredients loaded within the container 110. In this variation, the mixing system 100 can similarly include a third mixing section 154, a fourth mixing section 154, a fifth mixing section 154, etc.

In one example, the first mixing section 154 can include: a first shaft section defining a first end and a second end configured to engage (e.g., insert into) the attachment receptacle to couple the mixing section 154 to the connector section 152; and a first mixer 150 head arranged on the first end of the shaft section and configured to transiently mix ingredients loaded within the container 110 responsive to actuation of the motor 142. The second mixing section 154 can include: a second shaft section defining a first end and a second end configured to engage (e.g., insert into) the attachment receptacle to couple the second mixing section 154 to the connector section 152; and a second mixer 150 head arranged on the first end of the second shaft section and configured to transiently mix ingredients loaded within the container 110 responsive to actuation of the motor 142. In this variation, the mixing system 100 can therefore include a universal connector section 152 configured to transiently receive a suite of mixer 150 sections—each mixer 150 section defining a particular height and/or including a mixer 150 head (e.g., a frother, a whisk, a blade) corresponding to a particular beverage type—and engage the mixer receptacle 128 of the lid 120 to transiently locate the mixer 150 section within the container 110 (e.g., along the central axis) in preparation for mixing ingredients loaded within the container 110.

6. Drink Cycle

During operation, the mixing system 100 can execute a drink cycle, including a series of mix cycles, to mix contents of the container 110 into a homogenous mixture. During each mix cycle executed during the drink cycle, the mixing system 100 can actuate the motor 142 to rotate the mixer 150, such as at a constant mixing speed and for a duration of the mix cycle or at a varying mixing speed—such as by pulsing the motor 142 on and off in a series of mixing periods within the mix cycle—throughout the duration of the mix cycle.

Generally, once the user fills the container 110 with a particular mixture (i.e., beverage) and secures the lid 120, equipped with the mixer 150, to the container 110 (e.g., by coupling the coupling section 134 to the lid-receiving section 112), the mixing system 100 can initiate a drink cycle for this particular mixture. Throughout a duration of the drink cycle, the mixing system 100 can execute a series of mix cycles—such as responsive to inputs entered by the user and/or autonomously—during which the mixing system 100 (e.g., via a controller 144 in the electronics housing 130 of the lid 120) can actuate the motor 142 and the mixer 150 to semi-continuously and/or intermittently mix (e.g., blend, stir) the mixture (e.g., a settled mixture) to constitute a homogenous mixture.

6.1 Manual Mixing

In one implementation, the mixing system 100 can be configured to initiate a mix cycle responsive to a manual input entered by the user. In this implementation, the lid 120 can include a set of mixing controls (e.g., a set of buttons)

configured to receive user inputs, thereby enabling the user to trigger actuation of the motor 142 within the lid 120, such as before taking a sip of her beverage (e.g., a homogenous mixture) from the container 110. For example, the lid 120 can include a mixing control configured to trigger actuation of the motor 142—and thereby the mixer 150— at a particular speed (e.g., a preset speed) and for a particular duration (e.g., a preset duration) responsive to selection (e.g., by depressing the mixing control) by the user.

Additionally, in the preceding example, the mixing control can be configured to receive a series of user inputs from the user, such that the user may—in addition to selecting to initiate a mix cycle—select a magnitude (e.g., speed and/or duration) of the mix cycle. In particular, in response to the user selecting the mixing control (e.g., by depressing the mixing control) only once, within a threshold duration (e.g., 3 seconds, 5 seconds, 10 seconds), the mixing system 100 can trigger the motor 142 to actuate the mixer 150 at a first speed and/or for a first duration. However, in response to the user selecting the mixing control twice, within the threshold duration, the mixing system 100 can trigger the motor 142 to actuate the mixer 150 at a second speed, greater than the first speed, and/or for a second duration greater than the first duration. The mixing system 100 can therefore include a singular mixing control configured to enable user selection of blend settings (or "mix settings) from a set of predefined settings, thereby minimizing complexity of the lid 120 while providing the user increased control of mixing.

In another example, the lid 120 can include a set of mixing controls 149, each mixing control, in the set of mixing controls 149, configured to trigger actuation of the motor 142—and thereby the mixer 150— at a particular speed and for a particular duration. In particular, the lid 120 can include: a first mixing control corresponding to a first mixing speed; a second mixing control corresponding to a second mixing speed greater than the first mixing speed; and a third mixing control corresponding to a third mixing speed greater than the second mixing speed. In this example, in response to receiving selection of the first, second, or third mixing control, the mixing system 100 (e.g., via the controller 144) can trigger the motor 142 to actuate the mixer 150 at the corresponding speed associated with each of these mixing controls 149.

In yet another example, the lid 120 can include a set of mixing controls 149, each mixing control, in the set of mixing controls 149, linked to a particular type of beverage and configured to trigger actuation of the motor 142—and thereby the mixer 150—at a particular speed and/or for a particular duration matched to the particular type of beverage. In particular, in this example, the lid 120 can include: a first mixing control (e.g., a button including a coffee-related icon), linked to coffee-adjacent beverages (e.g., coffee drinks, espresso drinks, teas) and corresponding to a first mixing speed; a second mixing control (e.g., a button including an exercise-related icon) linked to exercise-related beverages (e.g., protein shakes) and corresponding to a second mixing speed; and a third mixing control (e.g., a button including a fruit icon) linked to smoothie-adjacent beverages and corresponding to a third mixing speed. The user may therefore select the mixing control, in the set of mixing controls 149, most closely related to a type of beverage currently in the container 110 in order to initiate a mix cycle matched to her beverage.

6.2 Variation: Mixing Protocols

Additionally and/or alternatively, in one variation, the mixing system 100 can be configured to automatically execute a series of mix cycles, throughout the drink cycle, according to a particular mixing protocol.

For example, a drink cycle can include a series of mix cycles, during which the motor 142 can be continuously, semi-continuously (e.g., pulsed), and/or intermittently actuated during a series of mixing periods within the mix cycle. The mixing protocol can define a set of operating parameters for the drink cycle such as: a speed of the motor 142 during mixing periods within a mix cycle; a duration of each mixing period (e.g., a 1-second pulse, 3 seconds, 10 seconds) within the mix cycle; a frequency of mixing periods (e.g., every 30 seconds, every minute, every 10 minutes) within the mix cycle (e.g., duration between mixing periods); a duration of each mix cycle within the drink cycle; and/or a frequency of mix cycles within the drink cycle (e.g., a duration between each mix cycle).

Once a mixing protocol is selected (e.g., manually by the user or autonomously), the mixing system 100 can autonomously actuate the motor 142 and the mixer 150: according to a set of operating parameters defined by the mixing protocol; and in order to continue mixing the user's beverage throughout the drink cycle without requiring manual inputs from the user to trigger mixing.

6.2.1 Mixing Protocol—Manual Selection

In one implementation, the mixing system 100 can similarly include a set of mixing controls 149 (e.g., a set of buttons) configured to receive user inputs, thereby enabling the user to select a particular mixing protocol for her beverage. Once receiving this selection by the user, the mixing system 100 can initiate and execute a drink cycle according to the particular mixing protocol selected by the user. For example, the mixing system 100 can define a set of predefined mixing protocols, each mixing protocol, in the set of predefined mixing protocols, defining a unique set of operating parameters and corresponding to a particular category of beverages. In this example, the lid 120 can include: a first mixing control corresponding to a first mixing protocol, in the set of predefined mixing protocols, and corresponding to coffee beverages; a second mixing control corresponding to a second mixing protocol, in the set of predefined mixing protocols, and corresponding to protein shakes; and a third mixing control corresponding to a third mixing protocol, in the set of predefined mixing protocols, and corresponding to smoothies. In response to selection of the first mixing control by the user, the mixing system 100 (e.g., via the controller 144) can initiate the drink cycle according to a first set of operating parameters defined by the first mixing protocol. The mixing system 100 can then autonomously actuate the motor 142 and the mixer 150, according to the first set of operating parameters defined by the first mixing protocol, to continue mixing the user's beverage throughout the drink cycle.

6.2.2 Mixing Protocol—Autonomous Selection

Alternatively, in another implementation, the mixing system 100 can autonomously identify a type (or "category") of beverage loaded in the container 110 in order to select and/or configure a mixing protocol for execution during a drink cycle. In this implementation, the mixing system 100 can include a set of sensors 160 (e.g., position, temperature, pressure, and/or current sensors) configured to output signals corresponding to a set of controls (e.g., viscosity, temperature, pressure) of a beverage in the container 110; and a controller 144 configured to monitor and/or interpret these signals. The mixing system 100 can then: read these signals to identify the set of controls; and identify a mixing protocol (e.g., from a set of predefined mixing protocols) for execution during a drink cycle for this beverage based on these measured controls.

In this implementation, the mixing system 100 can execute a calibration cycle, prior to initiation of the drink cycle, to measure these controls, and select and/or configure—such as based on a predefined model—a mixing protocol accordingly. For example, during a calibration cycle for a particular beverage, the mixing system 100 can identify a set of controls including: an interior temperature within the container 110; an interior pressure within the container 110; a fill level of liquid within the container 110; and/or a viscosity of liquid within the container 110. Based on these measured controls, the mixing system 100 can identify a particular mixing protocol matched to this beverage.

In one example, the mixing system 100 can: identify a relatively low viscosity of a first liquid mixture (e.g., coffee, bone broth) in the container 110; and select a first mixing protocol defining a higher frequency of mix cycles—due to increased rate of separation in the low viscosity mixture—and a lower mixing speed. Later, when the container 110 is loaded with a new beverage, the mixing system 100 can: identify a relatively high viscosity of a second liquid mixture (e.g., smoothie, a protein shake) in the container 110; and select a second mixing protocol defining a lower frequency of mix cycles—due to decreased rate of separation in the high viscosity mixture—and a higher mixing speed.

7. Variation: Dynamic Mixing Protocol

In one variation, the mixing system 100 can modify and/or configure the mixing protocol (e.g., during a drink cycle) in (near) real-time—such as by selectively initiating, modifying, omitting, and/or terminating a current or next mix cycle—based on a set of controls (e.g., drink controls and/or system controls) monitored by the mixing system 100 during the drink cycle, such as: angular position of the lid 120 and/or container 110; position of the lid 120 relative the container 110; pressure within the closed container 110; a fill level of liquid within the container 110; temperature of the container 110 and/or liquid within the container 110; viscosity of liquid within the container 110; etc.

In particular, in this variation, the mixing system 100 can include a set of sensors 160 (e.g., position, pressure, and/or temperature sensors)—such as coupled to the lid 120 and/or container 110 directly—configured to output signals corresponding to the set of controls. The controller 144 can then read these signals to configure and/or modify a mixing protocol for this particular beverage in (near) real-time. For example, the mixing system 100 can: terminate a mixing period (e.g., terminate actuation of the motor 142) responsive to detecting a change in the angular position of the container 110, such as while the user is actively drinking from the container 110 (e.g., via the opening 126 in the lid 120); initiate a mixing period and/or modify mix speed based on changes to the viscosity of the liquid; or skip a scheduled mixing period responsive to detecting a pressure drop in the container 110—which may indicate that the coupling section 134 of the lid 120 is not fully sealed with the receiving section of the container 110.

7.1 Target Drink Controls

In one implementation, the mixing system 100 can execute a calibration cycle—prior to initiation of the drink cycle—to identify a set of target drink controls (e.g., a target viscosity, a target temperature, a target pressure) corresponding to the beverage in the container 110. The mixing system 100 can then leverage these target drink controls to configure a dynamic mixing protocol for the succeeding drink cycle for this beverage.

For example, during a calibration cycle, the mixing system 100 can: actuate the motor 142 at a particular speed for a set duration; track a current value across the motor 142 over the set duration; convert current values (e.g., measured during the set duration) to torque output by the motor 142; and identify a target viscosity for this beverage based on a final magnitude of torque output by the motor 142 at an end of the set duration. Additionally and/or alternatively, in this example, the mixing system 100 can identify a target temperature for this beverage during the calibration cycle. The mixing system 100 can then configure a dynamic mixing protocol for a drink cycle for this beverage, the dynamic mixing protocol specifying: the target viscosity of the beverage; the target temperature of the beverage; and a set of operating parameters such as a frequency of mix cycles, a duration of mix cycles, a mixing speed, etc.

Then, during the drink cycle, the mixing system 100 can modify the set of operating parameters to: maintain a viscosity of the beverage within a first threshold deviation of the first target viscosity; and maintain a temperature of the beverage within a second threshold deviation of the target temperature. Over time, the mixing system 100 can then learn a best set of operating parameters for beverages: exhibiting target viscosities within a particular viscosity range including the target viscosity; and/or exhibiting temperatures within a particular temperature range including the target temperature.

In this implementation, the mixing system 100 can repeat calibration cycles during the drink cycle to semi-continuously or intermittently recalibrate the mixing system 100 and therefore update the mixing protocol.

7.2 System Controls

Additionally and/or alternatively, in one variation, the mixing system 100 can modify the mixing protocol in (near) real-time based on a set of system controls monitored during the drink cycle. For example, the mixing system 100 can be configured to monitor the set of system controls, such as: a tilt angle of the container 110 and/or lid 120 (e.g., relative an upright position); a fill level of liquid within the container 110; presence of leaks in the mixing system 100 (e.g., due to the user not fully securing the lid 120); interior pressure within the container 110; interior temperature within the container 110; etc. Based on these system controls, the mixing system 100 can selectively modify the mixing protocol, such as by: increasing or decreasing mixing speed; increasing or decreasing a duration of mixing cycles; increasing or decreasing a frequency of mixing cycles; and/or adding, skipping, or terminating a mixing cycle.

In one implementation, the mixing system 100 can include a set of sensors 160 integrated into the lid 120 and configured to record a set of system controls (e.g., within the container 110), such as at a target frequency during and/or between blend cycles. In this implementation, the controller 144 can be configured to: read the set of system controls recorded by the set of sensors 160; and actuate the motor 142 responsive to selection of the set of user controls 149 (e.g., by the user) and/or based on the set of controls. For example, the lid 120 can include a set of sensors 160 including: a first sensor configured to record an internal pressure within the container 110 in the closed configuration; and a second sensor configured to record an internal temperature within the container 110 in the closed configuration. In this example, the controller 144 can be configured to actuate the motor 142 according to a mixing protocol—such as a predefined mixing protocol and/or a dynamic mixing protocol—based on the internal pressure and the internal temperature recorded by the first and second sensor. The mixing system 100 can therefore leverage the set of system controls to selectively actuate the motor 142 and thereby regulate the set of system controls.

7.2.1 Tilt

In one variation, the mixing system 100 can be configured to selectively enable and/or disable actuation of the motor 142—and thereby mixing of contents within the container 110—based on an angular position of the container 110 (e.g., in the closed position).

In this variation, the mixing system 100 can be configured to detect changes in this angular position, such as relative an upright position defined by the container 110. The mixing system 100 can therefore avoid actuating the motor 142, and thereby mixing contents within the container 110, when the container 110 and/or lid 120 deviate (e.g., by more than a threshold amount) from this upright position.

For example, the container 110 can define an upright position in which a liquid fill level within the container 110 is approximately uniform (e.g., within five percent) throughout the container 110. The mixing system 100 can include: a container no position sensor coupled to the lid 120 or to the container 110 directly and configured to output a signal corresponding to an angular position of the container 110; and a controller 144 configured to read this signal output by the container 110 position sensor. The mixing system 100 (e.g., via the controller 144) can regularly check this signal to estimate the angular position of the container 110, such as once every ten seconds, once-per-minute, or before each mixing period (e.g., before actuating the motor 142).

In this example, at a first time, in response to detecting the container 110 at a first angular position (e.g., 5° offset the upright position) below a threshold angular position (e.g., 15° offset the upright position, 45° offset the upright position), the mixing system 100 can continue to enable actuation of the motor 142 and thereby mixing of contents within the container 110. However, at a second time succeeding the first time, in response to detecting the container 110 at a second angular position (e.g., 80° offset the upright position) exceeding the threshold angular position, the mixing system 100 can automatically disable actuation of the motor 142 and thereby disable mixing of contents within the container 110. In this example, the mixing system 100 can continue to track the angular position of the container 110 and reenable actuation of the motor 142 once the angular position of the container 110 falls within the threshold angular position.

Therefore, by disabling the motor 142 when the container 110 is tilted (e.g., at an angular position above a threshold angular position), the mixing system 100 can: reduce splashing, spilling, or leakage due to mixing while the user is drinking from the container 110; minimize pressure applied to the lid 120—including the motor 142, battery, and other electronic components—while the container 110 is tilted or inverted; and/or preserve battery life during instances that the user may be less likely to drink from the container 110, such as while the container 110 is stowed in her backpack or stored (e.g., horizontally) in a refrigerator.

7.2.2 Leak Detection

In one variation, the mixing system 100 can be configured to selectively enable and/or disable actuation of the motor 142—and thereby mixing of contents within the container 110—based on whether the lid 120 is secured (e.g., sealed) on the container 110.

In one implementation, the mixing system 100 can be configured to detect a position of the lid 120 relative the container 110, such as an angular position of the lid 120 relative the container 110 or a position of the bottom surface of the lid 120 relative the walls of the container 110. For example, the mixing system 100 can include a lid 120 position sensor coupled to the lid 120 or to the container 110 and configured to output a signal corresponding to a depth of the bottom of the surface of the lid 120 within the container 110. The mixing system 100 (e.g., via the controller 144) can regularly check this signal to estimate the position—and thereby security—of the lid 120 relative the container 110, such as once every ten seconds, once-per-minute, or before each mixing period (e.g., before actuating the motor 142). In this example, at a first time, in response to detecting the bottom surface of the lid 120 at a first depth (e.g., 1.5 centimeters), within the container 110, outside of a threshold deviation from a target depth (e.g., 2.0 centimeters), the mixing system 100 can disable actuation of the motor 142 and thereby disable mixing of contents within the container 110. However, at a second time succeeding the first time, in response to detecting the lid 120 at a second depth (e.g., 1.99 centimeters) within the threshold deviation from the target depth, the mixing system 100 can enable actuation of the motor 142 and thereby mixing of contents within the container 110.

Additionally and/or alternatively, in another implementation, the mixing system 100 can be configured to detect changes in pressure within the container 110, which may indicate whether the lid 120 is fully sealed against the container 110. For example, the mixing system 100 can include a pressure sensor coupled to the lid 120 or the container 110 and configured to output a signal corresponding to pressure within the container 110. In this example, if the mixing system 100 detects a pressure more than a threshold deviation below a target pressure within the container 110, the mixing system 100 can disable actuation of the motor 142. Therefore, by disabling the motor 142 when the lid 120 is not secured to the container 110, the mixing system 100 can reduce splashing, spilling, and/or leakage of contents from the container 110.

Additionally and/or alternatively, in this variation, the mixing system 100 can be configured to alert the user when the lid 120 is not secured to the container 110. For example, the mixing system 100 can trigger an indicator, in the set of indicators, to flash on and off (e.g., 3 times, for 30 seconds, until the lid 120 is secured) responsive to detecting that the lid 120 is not secured on the container 110.

7.2.3 Fill Level

In one variation, the mixing system 100 can be configured to selectively enable and/or disable actuation of the motor 142—and thereby mixing of contents within the container 110—based on a fill level of liquid within the container 110.

For example, the mixing system 100 can include an optical depth sensor coupled to the lid 120 and defining a field of view extending downward into the container 110. The optical depth sensor can output a signal corresponding to a liquid fill level within the container 110. In this example, the mixing system 100 (e.g., via the controller 144) can monitor whether the liquid fill level falls within a target fill level range. The mixing system 100 can then: disable the motor 142 if the liquid fill level exceeds this target range, indicating that the fill level of liquid within the container 110 is too high; enable actuation of the motor 142 if the distance falls within the target range; and/or disable the motor 142 if the distance falls below this target range, indicating that the fill level of liquid within the container 110 is too low (e.g., out of range of the mixer 150). Additionally and/or alternatively, in this example, the mixing system 100 and/or controller 144 can be configured to activate a fill level indicator—arranged on the outer face and configured to signal a depth of liquid within the container 110—in response to the fill level exceeding or falling below the target range and/or in response to the fill level exceeding a threshold fill level (e.g., defined for the container 110).

Additionally and/or alternatively, in another variation, the mixing system 100 can be configured to automatically adjust a speed of the motor 142 based on the fill level. For example, the mixing system 100 can: actuate the motor 142 at a first speed in response to detecting the fill level within a first distance range (e.g., falling within an upper region of the container 110); and actuate the motor 142 at a second speed (e.g., greater than the first speed) in response to detecting the fill level within a second distance range (e.g., falling within a lower region of the container 110 below the upper region).

Additionally and/or alternatively, in yet another variation, the mixing system 100 can be configured to selectively actuate the motor 142 based on the fill level and the angular position of the container 110. For example, the mixing system 100 can define a range of maximum tilt angles (e.g., maximum angular positions) corresponding to a range of fill levels of liquid within the container 110. In particular, in this example, the mixing system 100 can define: a first maximum tilt angle (e.g., 10°) corresponding to a first fill level (e.g., 95% full); and a second maximum tilt angle (e.g., 50°), exceeding the first maximum tilt angle, and corresponding to a second fill level (e.g., 40% full) less than the first fill level.

7.2.4 System Pressure

In one variation, the mixing system 100 can be configured to selectively actuate the motor 142 based on an interior pressure within the container 110.

For example, the mixing system 100 can include a pressure sensor coupled to the lid 120 or the container 110. In this example, the mixing system 100 can: access a pressure value corresponding to an interior pressure within the container 110; and, in response to the interior pressure value exceeding a maximum pressure threshold, decrease a speed of the motor 142 and/or deactivate the motor 142 to terminate mixing, thereby decreasing the interior pressure within the container 110. Further, in response to the interior pressure falling below a minimum pressure threshold, the mixing system 100 can increase the speed of the motor 142 to increase mixing speed, thereby increasing the interior pressure within the container 110.

7.2.5 System Temperature

In one variation, the mixing system 100 can be configured to selectively actuate the motor 142 based on temperature within the container 110. For example, the mixing system 100 can include a temperature sensor coupled to the lid 120 or container no. Then, in response to this temperature exceeding a maximum temperature threshold (e.g., a maximum temperature specified by the user or a preset maximum temperature), the mixing system 100 can actuate the motor 142 and/or increase a speed of the motor 142 to lower the temperature within the container 110. In this example, once the temperature drops below the maximum temperature threshold, the mixing system 100 can revert to operating according to a particular mixing protocol (e.g., a preset mixing protocol).

7.2.6 Charge Level

In one variation, the mixing system 100 can be configured to selectively actuate the motor 142 based on a charge level of the power supply 146 of the lid 120. In this variation, the controller 144 can: track a charge level of the power supply 146; and actuate the motor 142—responsive to selection of the set of user controls 149—according to a mixing protocol, in a set of mixing protocols, corresponding to the charge level. In particular, in response to the user selecting a particular user control—configured to trigger actuation of the motor 142—the controller 144 can: access a charge level of the power supply 146 (e.g., a battery); select a particular mixing protocol, in a set of mixing protocols, based on the charge level; and actuate the motor 142 according to the particular mixing protocol.

In one example, in response to the charge level falling below a threshold charge level (e.g., five percent, ten percent, twenty percent), the controller 144 can: select a first mixing protocol defining a first mix speed and/or a first mix duration; and actuate the motor 142 at the first speed and/or for the first duration according to the first mixing protocol. Alternatively, in response to the charge level exceeding the threshold charge level, the system can select a second mixing protocol—defining a second mix speed exceeding the first mix speed and/or defining a second mix duration exceeding the first mix duration; and actuate the motor 142 at the second speed and/or for the second duration according to the second mixing protocol.

By selectively actuating the motor 142 based on the charge level of the power supply 146, the mixing system 100 can therefore conserve power and extend a duration between charge cycles, thereby enabling the user to continue drinking mixed beverages from the container 110 while minimizing downtime due to required charging of the power supply 146. The mixing system 100 can thus balance output of power from the power supply 146 for mixing of beverages within the container 110 and power conservation.

8. Cleaning Cycle

In preparation for cleaning (e.g., once the user finishes drinking her beverage), the user may remove the lid 120 from the container 110 and/or remove the mixer 150 from the lid 120.

In one implementation, to clean the mixing system 100, the user may: remove the lid 120 from the container 110; dispose of any contents remaining in the container 110; add a first volume of water to the container 110; add a second volume of a cleaner (e.g., dish soap) to the first volume of water; replace the lid 120 on the container 110, including the mixer 150 attached to the lid 120; and trigger actuation of the motor 142 to mix the volumes of water and soap within the container 110, thereby rinsing and sanitizing interior surfaces of the container 110 and lid 120.

Additionally and/or alternatively, in another implementation, the mixing system 100 can be configured to selectively execute a cleaning cycle to clean the container 110, lid 120, and/or mixer 150 (e.g., between drink cycles). The cleaning cycle can define a cleaning protocol defining a particular set of operating parameters configured to enable cleaning (e.g., rinsing and/or sanitizing) of interior surfaces within the container 110 and/or lid 120, such as defining a high mixing speed and/or a high frequency of mix cycles. For example, the container 110 can be configured to: receive ingredients corresponding to a consumable beverage during a first time period; and receive a set of cleaning materials (e.g., a cleaning solution, a liquid and/or powdered detergent) during a second time period succeeding the first time period. In this example, the controller 144 can be configured to actuate the motor 142 according to a cleaning protocol, during the second time period, responsive to selection of a user control, in the set of user controls 149, corresponding to the cleaning cycle.

In this implementation, the mixing system 100 can be configured to enable the user to initiate (e.g., via selection of the set of mixing controls 149) a drink cycle or a cleaning cycle. For example, the lid 120 can include a mixing control configured to: trigger initiation of a drink cycle—according to a mixing protocol—responsive to a single click (e.g., entered by the user) of the mixing control; and trigger initiation of a cleaning cycle—according to a cleaning protocol—responsive to a double click (e.g., entered by the user) of the mixing control.

9. Variation: One Lid+Suite of Mixers+Suite of Containers

In one variation, the lid 120 can be configured to couple with any (generic) portable beverage container 110 of various shapes and/or sizes (e.g., height, volume). In this variation, the mixing system 100 can include a suite of mixers 150 configured to mix liquids in various generic beverage containers 110.

For example, the mixing system 100 can include: a first mixer 150 defining a first length (e.g., 15 centimeters) and configured to mix liquids in containers 110 of heights exceeding the first length and falling below a first threshold height (e.g., 20 centimeters); and a second mixer 150 defining a second length (e.g., 20 centimeters) greater than the first length and configured to mix liquids in containers 110 of heights exceeding the second length and falling below a second threshold height (e.g., 25 centimeters).

Additionally and/or alternatively, in another variation, the lid 120 can be configured to couple with a suite of containers 110. In one implementation, each container 110 can be matched to a particular mixer 150, in the set of mixers 150. For example, a user may purchase: a lid 120; a first beverage container 110 defining a first height and a first volume; and a first mixer 150 matched to the first height of the first container 110. Later, the user may purchase a second beverage container 110 defining a second volume exceeding the first volume of the first beverage container 110. More specifically, the user may purchase: the second container 110, defining the second volume, and defining a second height exceeding the first height; and a second mixer 150 matched to the second height of the second container 110.

Then, in this example, the user may: pour a protein beverage—including water and protein powder—into the first container 110 at her home in preparation for a trip to her gym; insert the first mixer 150 into the lid 120 and attach the lid 120 to the first container 110; and carry the first container 110 with her to the gym for an exercise class. Later, upon returning home after her class, the user may: remove the lid 120 from the first container 110; pour out any remaining contents (e.g., liquid) within the first container 110; fill the first container 110 with water and soap in preparation for a cleaning cycle; replace the lid 120 on the first container 110; and initiate the cleaning cycle to clean the lid 120, the first mixer 150, and the first container 110.

Then, the user may: remove the lid 120 from the first container 110; remove the first mixer 150 from the lid 120; insert the second mixer 150 into the lid 120; fill the second container 110 with a coffee beverage—including coffee, cream, and a collagen supplement—in preparation for work; secure the lid 120—including the second mixer 150—onto the second container 110; and carry the second container 110 to and around her office to drink her coffee beverage— exhibiting a smooth, consistent taste and texture—throughout the workday.

The mixing system 100s and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A mixing system comprising:
   a container defining an inner bore configured for loading with consumable beverages;
   a lid:
     configured to transiently couple to the container in a closed configuration;
     defining:
       an outer face and an inner face facing the inner bore in the closed configuration; and
       an opening extending between the outer face and the inner face and configured to convey fluid from the inner bore into a mouth of a user; and
     comprising:
       a housing;
       a mixer receptacle extending from the housing;
       a user interface arranged on the outer face and comprising a set of user controls;
       a set of sensors configured to record a set of controls within the container;
       a set of electronics arranged within the housing and comprising:
         a motor arranged within the housing and coupled to the mixer receptacle;
         a controller coupled to the motor and configured to transiently actuate the motor responsive to selection of the set of user controls by the user and based on the set of controls; and
         a power supply configured to supply power to the motor and the controller; and
       a set of supports:
         arranged about the motor within the housing; and
         configured to absorb energy output by the motor to stabilize the motor during actuation of the motor; and
   a mixer comprising:
     a connector section configured to transiently engage the mixer receptacle to mechanically couple the mixer to the motor; and
     a mixing section:
       extending from the connector section;
       configured to seat along a central axis defined by the container in the closed configuration; and
       configured to mix ingredients loaded within the inner bore of the container to generate a homogenous mixture responsive to actuation of the motor.

2. The mixing system of claim 1:
   wherein the mixing section defines a distal end opposite the connector section; and wherein the set of supports is configured to absorb energy output by the motor to reduce vibration of the motor and constrain displacement of the distal end from the central axis during rotation of the mixer responsive to actuation of the motor.

3. The mixing system of claim 1:
wherein the set of supports is formed of a silicone material;
wherein the container is formed of a glass material; and
wherein the mixing section is formed of a metal material.

4. The mixing system of claim 1:
wherein the motor is configured to rotate the mixer according to a set of blend settings;
wherein the set of user controls comprises:
   a first user control corresponding to a first blend setting in the set of blend settings; and
   a second user control corresponding to a second blend setting in the set of blend settings; and
wherein the controller is configured to:
   actuate the motor according to the first blend setting responsive to selection of the first user control by the user; and
   actuate the motor according to the second blend setting responsive to selection of the second user control by the user.

5. The mixing system of claim 4:
wherein the motor is configured to rotate the mixer according to the set of blend settings comprising:
   the first blend setting comprising a first mixing speed; and
   the second blend setting comprising a second mixing speed exceeding the first mixing speed; and
wherein the controller is configured to:
   actuate the motor according to the first mixing speed responsive to selection of the first user control by the user; and
   actuate the motor according to the second mixing speed responsive to selection of the second user control by the user.

6. The mixing system of claim 4:
wherein the motor is configured to rotate the mixer according to the set of blend settings comprising:
   the first blend setting corresponding to beverages of a first beverage type defining a first target temperature and a first target viscosity; and
   the second blend setting corresponding to beverages of a second beverage type defining a second target temperature and a second target viscosity; and
wherein the controller is configured to:
   actuate the motor according to the first blend setting, responsive to selection of the first user control, to:
      regulate temperature of ingredients in the container within a first threshold deviation of the first target temperature; and
      regulate viscosity of ingredients in the container within a second threshold deviation of the first target viscosity; and
   actuate the motor according to the second blend setting, responsive to selection of the second user control, to:
      regulate temperature of ingredients in the container within a third threshold deviation of the second target temperature; and
      regulate viscosity of ingredients in the container within a fourth threshold deviation of the second target viscosity.

7. The mixing system of claim 1:
wherein the lid comprises a charge receptacle configured to transiently receive a charge connector electrically coupled to an external power supply to electrically couple the external power supply to the power supply within the lid during a charge cycle; and
wherein the controller is configured to:
   track a charge level of the power supply;
   actuate the motor responsive to selection of the set of user controls and according to a mixing protocol, in a set of mixing protocols, corresponding to the charge level; and
   disable actuation of the motor during the charge cycle.

8. The mixing system of claim 1:
wherein the mixing section comprises a first mixing head corresponding to a first beverage type; and
further comprising a second mixer comprising:
   a second connector section configured to transiently engage the mixer receptacle to mechanically couple the second mixer to the motor; and
   a second mixing section:
      extending from the second connector section along the central axis;
      configured to rotate about the central axis to mix ingredients loaded within the inner bore of the container to generate a second homogenous mixture responsive to actuation of the motor; and
      comprising a second mixing head corresponding to a second beverage type.

9. The mixing system of claim 8:
wherein the first mixing head comprises a frother configured to aerate beverages of the first beverage type; and
wherein the second mixing head comprises a whisk configured to blend beverages of the second beverage type.

10. The mixing system of claim 1, wherein the lid further comprises:
a channel extending between the inner face and the outer face; and
a pressure valve arranged within the channel and configured to:
   occupy a closed state to prevent airflow through the channel; and
   transition from the closed state to an open state to release air from within the container to reduce pressure within the container in response to pressure within the container exceeding a threshold pressure.

11. The mixing system of claim 1:
wherein the set of sensors comprises:
   a first sensor configured to record an internal pressure within the container in the closed configuration; and
   a second sensor configured to record an internal temperature within the container in the closed configuration; and
wherein the controller is configured to actuate the motor according to a mixing protocol based on the internal pressure and the internal temperature.

12. The mixing system of claim 1:
wherein the set of user controls comprises a first user control corresponding to mixing speed; and
wherein the controller is configured to:
   track a quantity of selections entered by the user at the first user control within a set duration; and
   actuate the motor according to a particular mixing speed, in a set of mixing speeds, based on the quantity of selections.

13. The mixing system of claim 1:
   wherein the mixer receptacle is arranged below the housing and mechanically coupled to a driveshaft extending through the housing along the central axis defined by the container;
   wherein the motor is:
      mechanically coupled to the driveshaft; and
      configured to rotate the mixer receptacle to rotate the mixer;
   wherein the connector section of the mixer is configured to transiently engage the mixer receptacle to couple the mixer to the motor and locate the mixing section within the container and coaxial the driveshaft along the central axis; and
   wherein the set of supports is
      configured to absorb energy output by the motor to limit vibration of the motor to constrain displacement of the mixer from the central axis during actuation of the motor.

14. The mixing system of claim 1, wherein the set of supports comprises a set of silicone gaskets arranged between inner walls of the housing and surfaces of the motor and configured to flexibly constrain the motor within the housing.

15. The mixing system of claim 1:
   wherein the connector section comprises an attachment receptacle;
   wherein the mixing section comprises:
      a first shaft section defining a first end and a second end configured to insert into the attachment receptacle to couple the mixing section to the connector section; and
      a first mixing head arranged on the first end of the first shaft section and configured to transiently mix ingredients loaded within the container responsive to actuation of the motor; and
   further comprising a second mixing section comprising:
      a second shaft section defining a first end and a second end configured to insert into the attachment receptacle to couple the second mixing section to the connector section; and
      a second mixing head arranged on the first end of the second shaft section and configured to transiently mix ingredients loaded within the container responsive to actuation of the motor.

16. The mixing system of claim 1:
   wherein the set of sensors comprises a first sensor configured to record a fill level of fluid within the container;
   wherein the lid comprises:
      a fill level indicator arranged on the outer face and configured to signal a depth of liquid within the container; and
      a motor indicator configured to signal:
         actuation of the motor; and
         deactivation of the motor; and
   wherein the controller is configured to deactivate the motor and activate the fill level indicator in response to the fill level exceeding a threshold fill level defined for the container.

17. The mixing system of claim 1:
   wherein the set of sensors comprises:
      a first sensor configured to record an internal pressure within the container in the closed configuration; and
      a second sensor configured to record an internal temperature within the container in the closed configuration; and
   wherein the controller is configured to actuate the motor according to a mixing protocol to:
      regulate the internal pressure within a threshold deviation of a target pressure defined for the container;
      regulate the internal temperature within a threshold deviation of a target temperature defined for a beverage type, in a set of beverage types, of a beverage loaded in the container; and
      regulate a viscosity of the beverage within a threshold deviation of a target viscosity defined for the beverage type.

18. The mixing system of claim 1:
   wherein the set of sensors comprises a first sensor configured to record an internal pressure within the container in the closed configuration; and
   wherein the controller is configured to actuate the motor according to a mixing protocol to regulate the internal pressure within a threshold deviation of a target pressure defined for the container.

19. A mixing system comprising:
   a container defining an inner bore configured for loading with consumable beverages;
   a lid:
      configured to transiently couple to the container in a closed configuration;
      defining:
         an outer face and an inner face facing the inner bore in the closed configuration; and
         an opening extending between the outer face and the inner face and configured to convey fluid from the inner bore into a mouth of a user; and
      comprising:
         a housing;
         a mixer receptacle extending from the housing;
         a channel extending between the inner face and the outer face;
         a pressure valve arranged within the channel and configured to:
            occupy a closed state to prevent airflow through the channel; and
            transition from the closed state to an open state to release air from within the container to reduce pressure within the container in response to pressure within the container exceeding a threshold pressure;
         a user interface arranged on the outer face and comprising a set of user controls;
         a set of electronics arranged within the housing and comprising:
            a motor arranged within the housing and coupled to the mixer receptacle;
            a controller coupled to the motor and configured to transiently actuate the motor responsive to selection of the set of user controls by the user; and
            a power supply configured to supply power to the motor and the controller; and
         a set of supports:
            arranged about the motor within the housing; and
            configured to absorb energy output by the motor to stabilize the motor during actuation of the motor; and
   a mixer comprising:
      a connector section configured to transiently engage the mixer receptacle to mechanically couple the mixer to the motor; and a mixing section:
   extending from the connector section;
   configured to seat along a central axis defined by the container in the closed configuration; and
   configured to mix ingredients loaded within the inner bore of the container to generate a homogenous mixture responsive to actuation of the motor.

20. A mixing system comprising:
a container defining an inner bore configured for loading with consumable beverages;
a lid:
   configured to transiently couple to the container in a closed configuration;
   defining:
      an outer face and an inner face facing the inner bore in the closed configuration; and
      an opening extending between the outer face and the inner face and configured to convey fluid from the inner bore into a mouth of a user; and
   comprising:
      a housing;
      a mixer receptacle extending from the housing;
      a user interface arranged on the outer face and comprising a set of user controls;
      a first sensor configured to record an internal pressure within the container in the closed configuration;
      a second sensor configured to record an internal temperature within the container in the closed configuration;
      a set of electronics arranged within the housing and comprising:
         a motor arranged within the housing and coupled to the mixer receptacle;
         a controller coupled to the motor and configured to transiently actuate the motor:
            responsive to selection of the set of user controls by the user; and
            according to a mixing protocol based on the internal pressure and the internal temperature; and
         a power supply configured to supply power to the motor and the controller; and
      set of supports:
         arranged about the motor within the housing; and
         configured to absorb energy output by the motor to stabilize the motor during actuation of the motor; and
a mixer comprising:
   a connector section configured to transiently engage the mixer receptacle to mechanically couple the mixer to the motor; and
   a mixing section:
      extending from the connector section;
      configured to seat along a central axis defined by the container in the closed configuration; and
      configured to mix ingredients loaded within the inner bore of the container to generate a homogenous mixture responsive to actuation of the motor.

* * * * *